United States Patent Office 3,078,257
Patented Feb. 19, 1963

3,078,257
POLYURETHANE BRISTLES AND PROCESS
FOR THEIR MANUFACTURE
Heinrich Rinke and Otto Bayer, Leverkusen, Germany, assignors, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Filed July 7, 1958, Ser. No. 746,608
Claims priority, application Germany July 6, 1957
17 Claims. (Cl. 260—77.5)

It is known to react aromatic-aliphatic diprimary dialcohols with diisocyanates for the production of mixed polyurethanes. However, according to knowledge so far available (see O. Bayer, Angew. Chem. A 59, 257 (1948)), the concurrent use of such components leads to reduction in the resistance to cold.

This invention has as an object the manufacture of polyurethane bristles. A further object is the manufacture of polyurethane with improved physical characteristics. Another object is the manufacture of polyurethane bristles having a substantially higher flexural stiffness and better resistance to breaking. Other objects will appear hereinafter.

Generally speaking the foregoing objects are accomplished by providing polyurethane filaments prepared from aliphatic diols, aliphatic diisocyanates and arylalkyl diols or arylalkyl diisocyanates.

It has suprisingly been found that by comparison with bristles consisting of purely aliphatic polyurethanes, bristles of mixed polyurethanes having a molecular structure which contains 2–15%, preferably 3–5%, of residues of aromatic-aliphatic dialcohols or aromatic aliphatic diisocyanates of the general formula Z—R—X—Ar—X—R—Z in which Ar represents an aromatic radical, X represents ether or ester groups, R represents alkyl groups and Z represents OH or NCO groups, in addition to aliphatic dialcohols and diisocyanates, have a substantially higher flexural stiffness and better resistance to breaking. The percentage of 2–15% is calculated on the sum of residues of glycol or diisocyanate present in the polyurethane structure. Furthermore, bristles of polyurethanes modified in the above manner can be easily and cleanly rounded off at their ends by suitable polishing machines, this being of particular importance for example as regards tooth brushes. Furthermore, the slitting capacity of such modified bristles, which are for example suitable for domestic brushes, paint brushes and brooms, is an unexpected technical advance, since the usual polyurethane bristles available on the market cannot be polished or slit.

Representative examples of aliphatic diisocyanates are ethylene diisocyanate, 1.4-tetramethylene diisocyanate, 1.5-pentamethylene diisocyanate, 1.6-hexamethylene diisocyanate, 1.8-octamethylene diisocyanate, 1.16-hexadecamethylene diisocyanate, 1.2-propylene diisocyanate, ω,ω'-diisocyanato dipropylether, and the like. Aliphatic glycols suitable in the process of the invention are, for instance, ethylene glycol, 1.3-propanediol, 1.4-butanediol, pentamethylene glycol, hexamethylene glycol, 2.2-dimethyl propanediol-1.3, 2.2-dimethyl butanediol-1.4.

Any suitable arylalkyl diisocyanate and any suitable arylalkyl diol can be used in the process of the invention. The most favourable effect of the concurrent use of the relatively small amounts of aromatic-aliphatic additional components having the formula Z—R—X—Ar—X—R—Z is obtained when the functional terminal groups (OH or NCO) are separated by two or three methylene groups from the ether or ester groups which are on the nucleus. The aromatic nucleus need not be a simple benezene nucleus. It can be derived from diphenyl of naphthalene as well as, for instance, from diphenylmethane or diphenyldimethylmethane.

The following compounds have proved to be particularly effective as aromatic-aliphatic diprimary dialcohols:

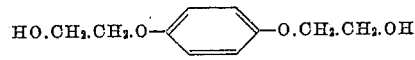

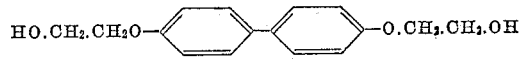

and

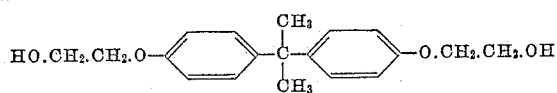

and the following as aromatic-aliphatic diisocyanates:

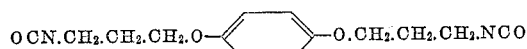

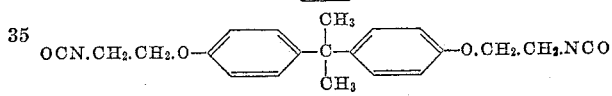

and

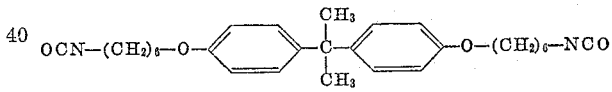

Reaction of the ingredients may be conducted either in the presence or preferably in the absence of solvents or diluents and in either open or sealed vessels. Reaction proceeds at room temperature or better with gently heating to about 30 to 60° C. Since the reaction is exothermic no further heating is necessary the temperature rising up to 150° C. by the exothermic reaction. Filaments can be made from the melt by the conventional melt-spinning processes as indicated in the examples.

In many cases it is preferable to employ besides the araliphatic components a mixture of aliphatic glycols or aliphatic diisocyanates which use of a mixture will allow for further increasing the physical characteristics of the bristles. Thus, for instance, admixing of a small amount of 2.2-dimethyl propanediol-1.3 to another glycol (e.g. butanediol) produces together with the araliphatic diol and the diisocyanate a further improvement of the mechanical properties of the polyurethane bristles.

*Example 1*

In a cylindrical glass vessel
87.3 parts by weight of 1.4-butanediol, 8.2 parts by weight of diphenyl-4.4'-bis-(β-hydroxy ethyl) ether, and 164.6 parts by weight of 1.6-hexamethylene diisocyanate are thoroughly mixed by means of a spiral stirrer and carefully heated to 40° C. Without further heating, the temperature rises within 60 minutes to 205° C., a viscous melt being formed which can be spun by conventional melt-spinning process from a single-aperture nozzle with a bore of 0.8 mm. From the filament with a thickness of 0.6 mm. which is obtained by chilling in a water bath at a temperature of 16° C., it is possible by immediate stretching to four times the length to obtain a filament with a thickness of 0.3 mm. which, by comparison with a filament of the polyurethane of 1.4-butanediol and 1.6 hexane diisocyanate, shows a clearly improved resistance to breaking and also a higher flexural stiffness. Furthermore, such filaments are capable of being slit in an excellent manner by suitable devices at the ends and rounded satisfactorily by polishing machines.

*Example 2*

A mixture of 87.3 parts by weight of 1.4-butanediol, 7.62 parts by weight of terephthalic acid-bis-(β-hydroxy ethyl) ester and 164.6 parts by weight of 1.6-hexamethylene diisocyanate is heated and treated in the same way as in Example 1 and the melt which is obtained is spun to form filaments. These filaments, after being stretched to four times their length, show a very good resistance to breaking and also flexural stiffness.

*Example 3*

A mixture of 85.5 parts by weight of 1.4-butanediol, 15.8 parts by weight of bis-(β-hydroxyethyl) ether of 4.4'-diphenyl-2.2-propane, and 164.8 parts by weight of 1.6-hexymethylene diisocyanate is converted by heating in the manner indicated in Example 1 into a melt of the mixed polyurethane, which is spun to form filaments which are then stretched.

The finished filaments have an excellent resistance to breaking and flexural stiffness and can be slit very satisfactorily.

*Example 4*

If the bis-(β-hydroxyethyl) ether of 4,4'-diphenyl-2.2-propane in Example 3 is replaced by 9.2 parts by weight of hydroquinone-bis-(β-hydroxyethyl) ether, a polyurethane melt is obtained from which, after spinning and stretching, it is also possible to obtain filaments which have a good resistance to breaking and flexural stiffness.

*Example 5*

A mixture of 86.4 parts by weight of 1.4-butanediol, 5.08 parts by weight of terephthalic acid bis-(β-hydroxy ethyl) ester, 2.08 parts by weight of 2.2-dimethyl propanediol-1.3, and 165.3 parts by weight of 1.6-hexamethylene diisocyanate is converted by heating in the manner indicated in Example 1 into a melt of the mixed polyurethane which is spun to form filaments. After stretching, these filaments have a good resistance to breaking and high flexural stiffness.

*Example 6*

A mixture of 90.0 parts by weight of 1.4-butanediol, 156.6 parts by weight of 1.6-hexamethylene diisocyanate, and 13.8 parts by weight of hydroquinone-bis-(γ-isocyanatopropyl) ether is reacted under heat in the same way as in Example 1 and the melt which is obtained is spun into filaments, which are immediately thereafter stretched to four times their length. These filaments have a high resistance to breaking and flexural stiffness.

The hydroquinone-bis-(γ-isocyanatopropyl) ether was obtained from the hydroquinone-bis-(γ-aminopropyl) ether by treatment with phosgene in known manner. B. Pt.$_{0.15}$ mm. Hg 182° C. M. Pt. 49–51° C.

The bis-carbamic acid methyl ester obtainable with methyl alcohol melts at 120–121° C.

| | C | H | N |
|---|---|---|---|
| $C_{16}H_{24}O_6N_2$ (340): | | | |
| Calculated | 56.5 | 7.1 | 8.2 |
| Found | 56.2 | 7.3 | 8.1 |

| | Properties of filaments from different mixed polyurethanes | | | |
|---|---|---|---|---|
| | Number of bents before breaking | | Flexural stiffness in percent | |
| | Dry | Wet | Dry | Wet |
| Polyurethane of 1.4-butanediol and 1.6-hexane diisocyanate | 102 | 164 | 100 | 75 |
| Products of: | | | | |
| Example 1 | 152 | -------- | 115 | -------- |
| Example 2 | 222 | 349 | 104 | -------- |
| Example 3 | 240 | 298 | 111 | 84 |
| Example 4 | 197 | 303 | 105 | 79 |
| Example 5 | 267 | 337 | 121 | 84 |
| Example 6 | 193 | 264 | 112 | 85 |

What is claimed is:

1. A process for making polyurethane bristles which comprises mixing an aliphatic diol, an aliphatic diisocyanate and a member selected from the group consisting of:

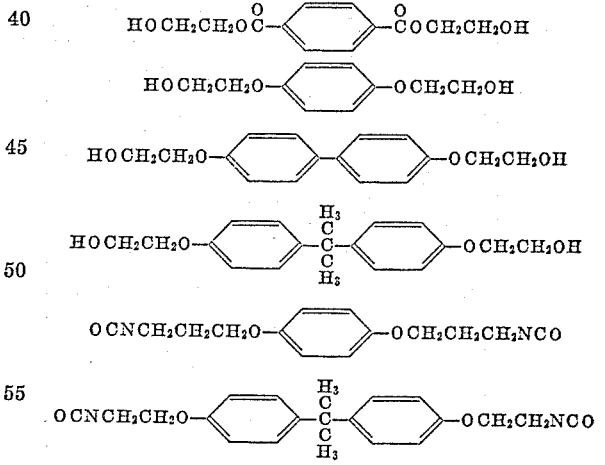

and

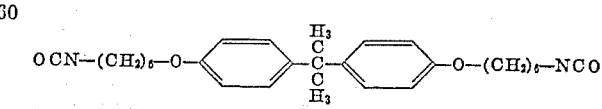

with the proviso that when the group member is hydroxyl terminated, the quantity of the group member is from about 2% to about 15% of the total glycol present in the polyurethane structure, and when the group member is —NCO terminated, the quantity of the group member is from about 2% to about 15% of the total diisocyanate present in the polyurethane structure, heating said mixture to from about 30° C. to about 60° C. to initiate the exothermic reaction and spinning the resulting viscous melt into filaments.

2. Polyurethane bristles comprising the reaction product of an aliphatic diol, an aliphatic diisocyanate and a compound having the formula:

$$Z—R—X—Ar—X—R—Z$$

wherein Ar is an aromatic radical, X is a member selected from the group consisting of —O— and $$-\overset{\overset{\displaystyle O}{\|}}{C}-O-$$

R is an alkylene radical of up to and including six carbon atoms and Z is a member selected from the group consisting of —OH and —NCO groups, with the proviso that when both Z's in the above formula are —OH, the quantity of the compound having the formula set forth is from about 2% to about 15% of the total glycol present in the polyurethane structure and when both Z's in the formula are —NCO, the quantity of the compound having the formula set forth is from about 2% to about 15% of the total diisocyanate present in the polyurethane structure.

3. A process for making polyurethane bristles which comprises mixing an aliphatic diol, an aliphatic diisocyanate and a compound having the formula:

$$Z—R—X—Ar—X—R—Z$$

wherein Ar is an aromatic radical, X is a member selected from the group consisting of —O— and $$-\overset{\overset{\displaystyle O}{\|}}{C}-O-$$

R is an alkylene radical of up to and including six carbon atoms and Z is a member selected from the group consisting of —OH and —NCO groups, with the proviso that when both Z's in the above formula are —OH, the quantity of the compound having the formula set forth is from about 2% to about 15% of the total glycol present in the polyurethane structure and when both Z's in the formula are —NCO, the quantity of the compound having the formula set forth is from about 2% to about 15% of the total diisocyanate present in the polyurethane structure, permitting said mixture to react and spinning the resulting viscous melt into filaments.

4. A process for making polyurethane bristles which comprises mixing an aliphatic diol, an aliphatic diisocyanate and a compound having the formula:

$$HO—R—X—Ar—X—R—OH$$

wherein Ar is an aromatic radical, X is a member selected from the group consisting of —O— and $$-\overset{\overset{\displaystyle O}{\|}}{C}-O-$$

and R is an alkylene radical of up to and including six carbon atoms, the quantity of the compound having the formula set forth is from about 2% to about 15% of the total glycol present in the polyurethane structure, permitting said mixture to react and spinning the resulting viscous melt into filaments.

5. A process for making polyurethane bristles which comprises reacting an aliphatic diol, an aliphatic diisocyanate and a compound having the formula:

$$OCN—R—X—Ar—X—R—NCO$$

wherein Ar is an aromatic radical, X is a member selected from the group consisting of —O— and $$-\overset{\overset{\displaystyle O}{\|}}{C}-O-$$

and R is an alkylene radical of up to and including six carbon atoms, the quantity of the compound having the formula set forth is from about 2% to about 15% of the total diisocyanate present in the polyurethane structure, permitting said mixture to react and spinning the resulting viscous melt into filaments.

6. Polyurethane bristles comprising the reaction product of an aliphatic diol, an aliphatic diisocyanate and a compound having the formula:

$$HO—R—X—Ar—X—R—OH$$

wherein Ar is an aromatic radical, X is a member selected from the group consisting of —O— and $$-\overset{\overset{\displaystyle O}{\|}}{C}-O-$$

and R is an alkylene radical of up to and including six carbon atoms, the quantity of the compound having the formula set forth is from about 2% to about 15% of the total glycol present in the polyurethane structure.

7. Polyurethane bristles comprising the reaction product of an aliphatic diol, an aliphatic diisocyanate and a compound having the formula:

$$OCN—R—X—Ar—X—R—NCO$$

wherein Ar is an aromatic radical, X is a member selected from the group consisting of —O— and $$-\overset{\overset{\displaystyle O}{\|}}{C}-O-$$

and R is an alkylene radical of up to and including six carbon atoms, the quantity of the compound having the formula set forth is from about 2% to about 15% of the total diisocyanate present in the polyurethane structure.

8. The process of claim 4 wherein the aliphatic diol is 1,4-butanediol, the aliphatic diisocyanate is 1,6-hexamethylene diisocyanate and the compound having the formula set forth is diphenyl-4,4'-bis-(β-hydroxyethyl) ether.

9. The process of claim 4 wherein the aliphatic diol is 1,4-butanediol, the aliphatic diisocyanate is 1,6-hexamethylene diisocyanate and the compound having the formula set forth is terephthalic acid-bis-(β-hydroxyethyl) ester.

10. The process of claim 4 wherein the aliphatic diol is 1,4-butanediol, the aliphatic diisocyanate is 1,6-hexamethylene diisocyanate and the compound having the formula set forth is 4,4'-bis-(β-hydroxyethyl) ether of diphenyl-2,2-propane.

11. The process of claim 4 wherein the aliphatic diol is 1,4-butanediol, the aliphatic diisocyanate is 1,6-hexamethylene diisocyanate and the compound having the formula set forth is hydroquinone-bis-(β-hydroxyethyl) ether.

12. The process of claim 4 wherein the aliphatic diol is 1,4-butanediol, the aliphatic diisocyanate is 1,6-hexamethylene diisocyanate and the compound having the formula set forth is terephthalic acid-bis-(β-hydroxyethyl) ester and 2,2-dimethyl propanediol-1,3.

13. Polyurethane bristles according to claim 6 wherein the aliphatic diol is 1,4-butanediol, the aliphatic diisocyanate is 1,6-hexamethylene diisocyanate and the compound having the formula set forth is diphenyl-4,4'-bis-(β-hydroxyethyl) ether.

14. Polyurethane bristles according to claim 6 wherein the aliphatic diol is 1,4-butanediol, the aliphatic diisocyanate is 1,6-hexamethylene diisocyanate and the compound having the formula set forth is terephthalic acid-bis-(β-hydroxyethyl) ester.

15. Polyurethane bristles according to claim 6 wherein the aliphatic diol is 1,4-butanediol, the aliphatic diisocyanate is 1,6-hexamethylene diisocyanate and the compound having the formula set forth is 4,4'-bis-(β-hydroxyethyl) ether of diphenyl-2,2-propane.

16. Polyurethane bristles according to claim 6 wherein the aliphatic diol is 1,4-butanediol, the aliphatic diisocyanate is 1,6-hexamethylene diisocyanate and the compound having the formula set forth is hydroquinone-bis-(β-hydroxyethyl) ether.

17. Polyurethane bristles according to claim 6 wherein the aliphatic diol is 1,4-butanediol, the aliphatic diisocyanate is 1,6-hexamethylene diisocyanate and the compound having the formula set forth is terephthalic acid-bis-(β-hydroxyethyl) ester of 2,2-dimethyl propanediol-1,3.

References Cited in the file of this patent

UNITED STATES PATENTS

| | | |
|---|---|---|
| 2,333,639 | Christ et al. | Nov. 9, 1943 |
| 2,658,886 | Swerdloff | Nov. 10, 1953 |

FOREIGN PATENTS

| | | |
|---|---|---|
| 845,917 | France | May 22, 1939 |
| 52,968 | France | July 17, 1944 |
| | (Addition to No. 845,917) | |

OTHER REFERENCES

Bayer: "Modern Plastics," June 1947, pages 149–152.
Bayer: "Angewandte Chemie," vol. 59, No. 9, pages 257–272, Sept. 1947.